US009605980B2

(12) United States Patent
Reusing et al.

(10) Patent No.: US 9,605,980 B2
(45) Date of Patent: Mar. 28, 2017

(54) INDUCTIVE SENSOR FOR A POSITION MEASURING SYSTEM, METHOD OF MANUFACTURING INDUCTIVE SENSOR, AND POSITION MEASURING SYSTEM PROVIDED WITH INDUCTIVE SENSOR

(75) Inventors: Guenter Reusing, Niederwerrn (DE); Roman Hollweck, Kaufbeuren (DE); Karin Hauser, Kempten (DE); Anton Stier, Biessenhofen (DE); Florian Hohnke, Kaufbeuren (DE)

(73) Assignee: Robert Bosch GmbH, Stuttgart (DE)

( * ) Notice: Subject to any disclaimer, the term of this patent is extended or adjusted under 35 U.S.C. 154(b) by 1620 days.

(21) Appl. No.: 12/037,554

(22) Filed: Feb. 26, 2008

(65) Prior Publication Data
US 2008/0211489 A1      Sep. 4, 2008

(30) Foreign Application Priority Data
Mar. 1, 2007   (DE) .................. 10 2007 009 994

(51) Int. Cl.
*G01B 7/14*       (2006.01)
*G01D 5/20*       (2006.01)
(Continued)

(52) U.S. Cl.
CPC .......... *G01D 5/2006* (2013.01); *F16C 29/00* (2013.01); *G01B 7/023* (2013.01); *G01B 7/14* (2013.01); *Y10T 29/4902* (2015.01)

(58) Field of Classification Search
CPC .......... G01D 5/2006; G01D 5/20; G01D 5/22; G01D 5/2208; G01D 5/225; G01D 5/2291; G01B 7/023; G01B 7/14; G01B 7/003; G01B 7/30; G01B 7/00; G01B 7/10; G01B 21/16; G01B 3/004
(Continued)

(56) References Cited

U.S. PATENT DOCUMENTS 4,804,911 A  *  2/1989   Saito et al. .................... 324/167
5,075,585 A  *  12/1991  Teruyama et al. .............. 310/89
(Continued)

FOREIGN PATENT DOCUMENTS

DE       42 05 957      9/1993
DE       198 44 738     5/2000
(Continued)

OTHER PUBLICATIONS

Definition of the term "measure," obtained from Dictionary.com, http://dictionary.reference.com/browse/measure?s=t, obtained on Jul. 26, 2015.*
(Continued)

*Primary Examiner* — Jay Patidar
*Assistant Examiner* — David M. Schindler
(74) *Attorney, Agent, or Firm* — Michael J. Striker

(57) ABSTRACT

An inductive sensor has an electrically nonconductive substrate, at least one electrically conducting coil that is integrally joined to the substrate, with the mechanical rigidity of the substrate significantly greater than that of the conducting coil, a metal plate covering the conducting coil, with the substrate comprised by the metal plate, and with the surface of the metal plate on the side oriented toward the conducting coil provided with an electrically insulating layer.

12 Claims, 5 Drawing Sheets

(51) Int. Cl.
*G01B 7/02* (2006.01)
*F16C 29/00* (2006.01)

(58) Field of Classification Search
USPC .................................................. 324/207.16
See application file for complete search history.

(56) References Cited

U.S. PATENT DOCUMENTS

| | | | | |
|---|---|---|---|---|
| 5,231,757 | A | * | 8/1993 | Chantraine et al. ............ 29/852 |
| 5,600,240 | A | * | 2/1997 | Mikhailovich et al. ...... 324/219 |
| 5,835,350 | A | * | 11/1998 | Stevens ......................... 361/704 |
| 5,901,458 | A | | 5/1999 | Andermo et al. |
| 6,051,971 | A | * | 4/2000 | Holden .................... 324/207.24 |
| 6,486,796 | B2 | | 11/2002 | Miyata |
| 6,564,468 | B2 | | 5/2003 | Blattner et al. |
| 6,611,138 | B2 | | 8/2003 | Vasiloiu |
| 6,734,665 | B2 | | 5/2004 | Jagiella et al. |
| 6,975,108 | B2 | * | 12/2005 | Bilik et al. .................... 324/237 |
| 7,033,080 | B2 | | 4/2006 | Landrieve et al. |
| 7,096,595 | B2 | | 8/2006 | Greubel |
| 7,463,020 | B2 | * | 12/2008 | Kuhn ....................... 324/207.11 |
| 7,586,303 | B2 | * | 9/2009 | Kirchdoerffer et al. . 324/207.26 |
| 2002/0011838 | A1 | * | 1/2002 | Miyata et al. ............ 324/207.17 |
| 2002/0017902 | A1 | * | 2/2002 | Vasiloiu ................... 324/207.17 |
| 2002/0168800 | A1 | * | 11/2002 | Smith et al. .................. 438/128 |
| 2005/0055841 | A1 | * | 3/2005 | Scherzinger et al. .......... 33/834 |
| 2005/0174209 | A1 | * | 8/2005 | Teshima et al. .............. 336/200 |
| 2007/0006641 | A1 | | 1/2007 | Wiedemann et al. |

FOREIGN PATENT DOCUMENTS

| | | |
|---|---|---|
| DE | 100 48 290 | 5/2002 |
| DE | 103 47 360 | 5/2005 |
| DE | 103 60 941 | 7/2005 |
| EP | 0 182 085 | 5/1986 |
| EP | 0 743 508 | 11/1996 |
| EP | 1 052 480 | 11/2000 |
| EP | 1 164 358 | 12/2001 |
| EP | 101 34 184 | 1/2002 |
| WO | WO 2006084675 A1 * | 8/2006 |

OTHER PUBLICATIONS

Definition of the term "material," obtained from Dictionary.com, http://dictionary.reference.com/browse/material?s=t, obtained on Jul. 26, 2015.*

Definition of the term "period," obtained from Dictionary.com, http://dictionary.reference.com/browse/period?s=t, obtained on Jul. 26, 2015.*

"Integrated Measurement System Manual for Ball Tracks and Rolling Rail Guides" Published by Bosch Rexroth AG (No. R310DE 2386), Apr. 2004.

* cited by examiner

INDUCTIVE SENSOR FOR A POSITION MEASURING SYSTEM, METHOD OF MANUFACTURING INDUCTIVE SENSOR, AND POSITION MEASURING SYSTEM PROVIDED WITH INDUCTIVE SENSOR

CROSS-REFERENCE TO A RELATED APPLICATION

The invention described and claimed hereinbelow is also described in German Patent Application DE 10 2007 009 994.2 filed on Mar. 1, 2007. This German Patent Application, whose subject matter is incorporated here by reference, provides the basis for a claim of priority of invention under 35 U.S.C. 119(a)-(d).

BACKGROUND OF THE INVENTION

The invention relates to an inductive sensor, a position measuring system equipped with this sensor, and a method for its manufacture.

An inductive sensor is known, for example, from EP 0 743 508 A2, whose FIGS. 16A and 16B show a sensor in which a number of electrical conducting coils 102, 104 are applied to a substrate 126. The conducting coils are situated in a number of layers that are electrically separated from one another by thin insulating layers 162. An insulating layer 162 is also used to cover the sensor so that the conducting coils are protected from environmental influences, e.g. from the penetration of electrically conductive fluids. The substrate 126 is embodied in the form of an electrical printed circuit board. This substrate gives the whole arrangement the necessary mechanical strength. The conducting coil is manufactured by subjecting a thin copper layer, which is mounted over an entire area, to a photochemical etching process. The insulation layers 162 are varnish layers. FIG. 16b depicts the thickness of the conducting coils and insulation layers in an exaggerated fashion in comparison to that of the substrate.

A similar sensor is used in the linear position measuring device that is known from the publication "Integrated Measurement System Manual for Ball Tracks and Rolling Rail Guides" [Anleitung Integriertes Messsystem für Kugel-und Rollenschienenführungen], published by Bosch Rexroth AG (No. R310DE 2386; published April, 2004). To protect it from mechanical damage, this sensor was additionally covered with a thin steel plate. This metal cover is necessary because the above-mentioned guides are used, among other things, in machine tools in which they are exposed to corrosive coolants and lubricants. The thin protective layer according to EP 0 743 508 A2 would not be able to withstand such exposure. A cover made of a plastic would also be unsuitable since assuring the required durability would require it to be too thick. The cover plate is mounted after the contact has been produced between the conducting coil and the connecting line leading to the evaluation electronics since the contact point is no longer accessible afterward. In order to protect against the penetration of fluids, the sensor is also cast in a synthetic resin.

The steel plate cover attenuates the signals that the sensor generates when scanning the associated material measure. This attenuation is caused among other things by eddy currents that the alternating currents induce in the conducting coils of the sensor. These eddy currents can be minimized through the use of a particularly thin cover plate (thickness of 50 to 200 μm).

The signal is also attenuated by the increased distance between the conducting coils and the material measure. This distance is increased on the one hand by the thickness of the cover plate. The distance is also increased by the adhesive layer between the sensor and the cover plate. The distance is additionally increased by the covering insulation layer that is provided on the substrate during manufacture of the conducting coil. In this context, it should be noted that the overall distance between the conducting coils of the sensor and the material measure should under no circumstances be greater than the graduation of the material measure since otherwise, the necessary measurement precision is no longer assured. In the linear position measuring device mentioned above, the graduation is 1 mm; smaller graduations are being sought in order to increase the measurement precision. Where technically possible, the above-mentioned distance should be embodied to be as small as possible.

For the sake of completeness, reference is also made to DE 103 60 941 A1, which discloses a pressure sensor of a different generic type. In the embodiment according to FIG. 3, a measuring device 6 and a strain gauge 60 are applied to a diaphragm 4 using a thin-layer technology. Pressure sensors, however, are not comparable to the inductive sensors according to the present invention since the above-described distance problem does not arise in pressure measurement. The diaphragm disclosed also has to be a great deal thicker than the cover plate in an inductive sensor since it must withstand the compressive forces to be measured.

SUMMARY OF THE INVENTION

The object of the present invention is to create a sensor of the type generically defined in the preamble in which it is possible to select a smaller distance between the conducting coils and the associated material measure. In addition, the manufacture of the sensor should be simplified.

This object is attained in that the metal plate for covering is simultaneously used as a substrate that gives the conducting coil the necessary stability. It is therefore possible to eliminate the separate substrate. It is also possible to apply the conducting coil directly to the metal plate. A separate adhesive layer can be eliminated. Since the metal plate is electrically conductive, an insulating layer must be provided on the side of the conducting coil. This can be much thinner than a separate adhesive layer. The insulating layer is preferably thinner than 10 μm. Most preferably, a monophase layer is provided since this can be embodied as particularly thin. The metal plate is preferably thinner than 0.2 mm.

So that the conducting coil can be simply manufactured using a known photochemical etching process, it is embodied in the form of a flat spiral. In a process of this kind, first a metal layer preferably composed of copper is applied to the entire surface of the substrate and coated with a light-sensitive varnish. Then, a mask is used to expose the desired conductor structures onto this varnish. The exposed varnish surfaces are then chemically dissolved. The revealed regions of the metal layer can consequently be etched away with an etching fluid so that only the desired conducting coils remain. A method of this kind is able to inexpensively manufacture intersection-free planar conductor arrangements, which is why the above-mentioned spiral-shaped coils are preferable. The spirals here do not necessarily have to be circular. Square or rectangular shapes can also be provided. In order for the sensor to emit a sufficiently powerful signal, the spiral has at least 10 loops.

The insulation layer can be made very thin through the use of a centrifuge method. In this method, a fluid plastic, preferably polyimide, is applied to the metal plate, which is then set into rapid rotation around an axis perpendicular to the plane of the plate so that the centrifugal force distributes the fluid plastic in a very thin layer over the entire surface of the plate. Excess plastic is spun off from the plate surface. After the centrifuging process, the plastic is hardened into a solid layer. Polyimide is particularly well-suited to the manufacture of very thin insulation layers. In addition, the metal layer to be applied next for the conducting coils adheres particularly well to this material.

The sensors can be manufactured in a particularly inexpensive fashion if the insulating layer and the at least one conducting coil for a number of sensors are applied to a metal plate simultaneously and the individual sensors are then cut out from the metal plate, preferably by means of a laser beam. The process steps in the photochemical etching and in the application of the insulation layer can be easily executed for a number of sensors simultaneously, with only a slightly greater degree of complexity so that the amount of work per sensor decreases. It is preferable to cut the plate into pieces using a laser beam because there is no danger of bending the thin metal plate.

The sensor can have a housing with at least a first opening, where the first opening is closed by the metal plate so that the conducting coil is situated on the interior of the housing. The housing supports the relatively unstable metal plate. At the same time, the housing can serve to fasten the metal plate to a larger structural unit such as the guide carriage of a linear roller bearing. To this end, the housing has fastening means that are suitable for setting the distance between the metal plate and the material measure on the guide rail to the desired low value of preferably less than 0.1 mm. At the same time, however, the metal plate should not touch the material measure. Naturally, the housing also serves to protect the sensitive conducting coil. It is therefore practical for the metal plate to completely cover the first opening so that no foreign substances such as coolant or lubricant can penetrate into the housing.

The preferably flat metal plate is welded to the housing; the welding seam does not protrude above the plane that is defined by the outer surface of the metal plate. By avoiding a protruding welding seam, it is possible to embody a particularly small distance between the conducting coil and the material measure since the welding seam does not require any additional space. In this embodiment, the housing is preferably composed of metal since this permits a particularly strong welded connection to be manufactured. The welded connection can also easily be embodied as fluid-tight. A flat metal plate is preferable because it is particularly simple to manufacture. The same applies to the flat contact surface for the metal plate on the housing.

The metal plate can be welded to the housing by means of a laser beam. When a laser beam is used, it is very easily possible to produce a welding seam that does not protrude above the metal plate. On the one hand, this is due to the fact that a laser beam can produce a very thin welding seam. On the other hand, the laser beam can be directed very precisely to the desired welding point by means of suitable optics. In the present case, it has proven worthwhile to aim the laser beam at a position at the edge of the housing, which is spaced approximately half the welding seam width apart from the contact surface of the metal plate so that the edge of the welding seam just barely catches the metal plate. This makes it possible to effectively prevent a protrusion of the welding seam.

The housing can have at least one second opening into which a casting compound is poured, which the metal plate supports. Through a second housing opening, the contact is produced between the conducting coil and the connecting cable for the evaluation electronics. Together with the first opening, the second opening preferably constitutes a passage in the housing, thus providing particularly good access to the back side of the metal plate. The casting compound on the one hand protects the conducting coil and the contacts from environmental influences. To this end, the casting compound should cover and enclose all components that are to be protected. On the other hand, the casting compound gives the metal plate the necessary strength so that it cannot be inadvertently bent, for example, during installation of the sensor.

In order to electrically connect the conducting coil to associated evaluation electronics, a flexible printed circuit board with a contacting section and a connecting section can be provided; the contacting section is completely covered with the casting compound and the connecting section protrudes out from the casting compound. A flexible printed circuit board represents a particularly inexpensive possibility for providing a number of electrical connecting lines between two subassemblies. In connection with the sensor here, usually a large number of connecting lines are necessary since the sensor can have a plurality of separate conducting coils that must be connected to the evaluation electronics. Among other things, a plurality of separate conducting coils can increase the evaluation precision of the related position measuring device.

The contacting section of the flexible printed circuit board is preferably situated parallel to the metal plate, thus allowing the distance between the contacting points on the flexible printed circuit board and on the metal plate to be embodied as particularly small, particularly in the case in which the contacting points are situated distributed over the entire surface of the metal plate. Because the contacting section is covered with casting compound, the contacting points are particularly well protected from environmental influences.

Between the contacting section and the metal plate, a dividing layer can be provided, which has a significantly lower modulus of elasticity than and is at least five times thicker than the metal plate. The dividing layer aligns the contacting section in relation to the metal plate. The dividing layer is preferably composed of an electrically nonconductive material and is preferably provided with an adhesive layer on both sides so that there is a fixed connection between the contacting section and the metal plate. In order to avoid transmitting irregularities from the contacting section to the metal plate, the dividing layer has the thickness and modulus of elasticity mentioned above.

The contacting section of the flexible printed circuit board can be provided with at least one contact surface that is connected in an electrically conductive fashion via a wire to the at least one conducting coil on the metal plate; an electric conductor track leads from the contact surface into the connecting section of the flexible printed circuit board. The proposed bonding permits a particularly inexpensive connection between the contacting section and the conducting coil since conventional automated apparatuses can be used to manufacture it. The related wires are preferably embodied as very thin (less than 0.1 mm in diameter) and are composed of aluminum or gold. Due to the low strength of the wires, care must be taken to match the thermal expansion coefficients of the casting compound, wires, contacting section, and metal plate to one another so that temperature changes do not cause the wires to tear.

Preferably, the connecting point between the wire and the at least one conducting coil is not covered by the contacting section of the flexible printed circuit board so that this connecting point is easily accessible to the bonding apparatus.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
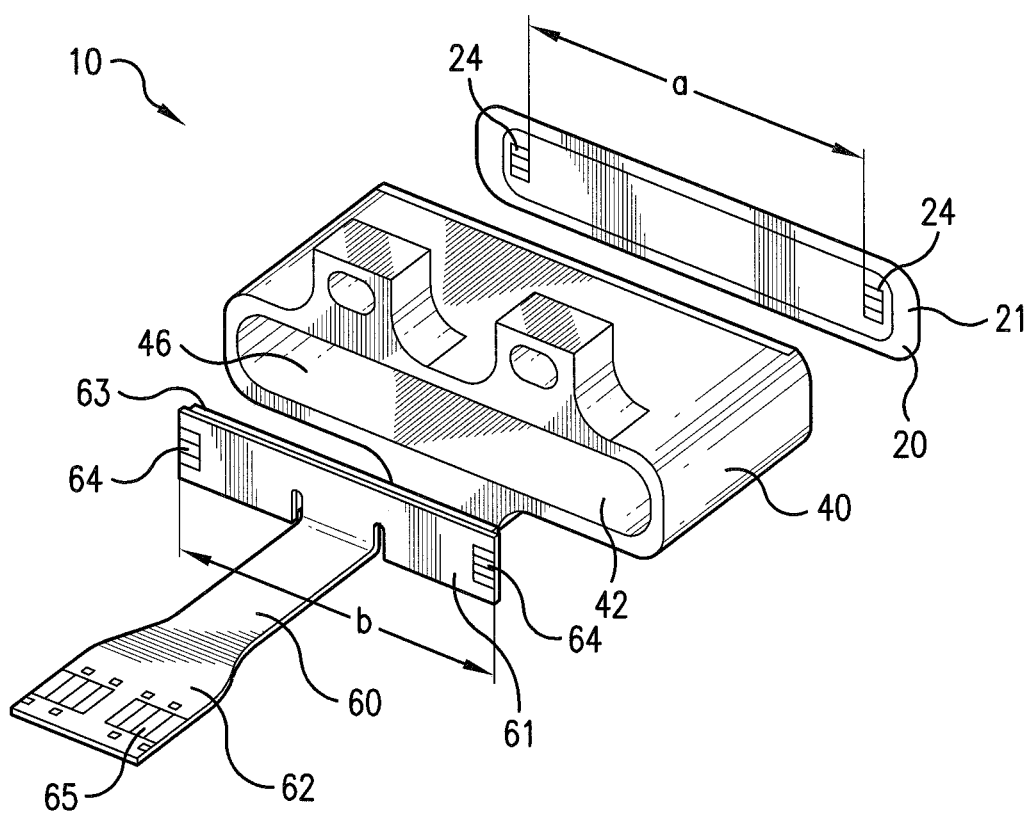
FIG. 1 is an exploded depiction of a sensor according to the present invention.
Figure 2:
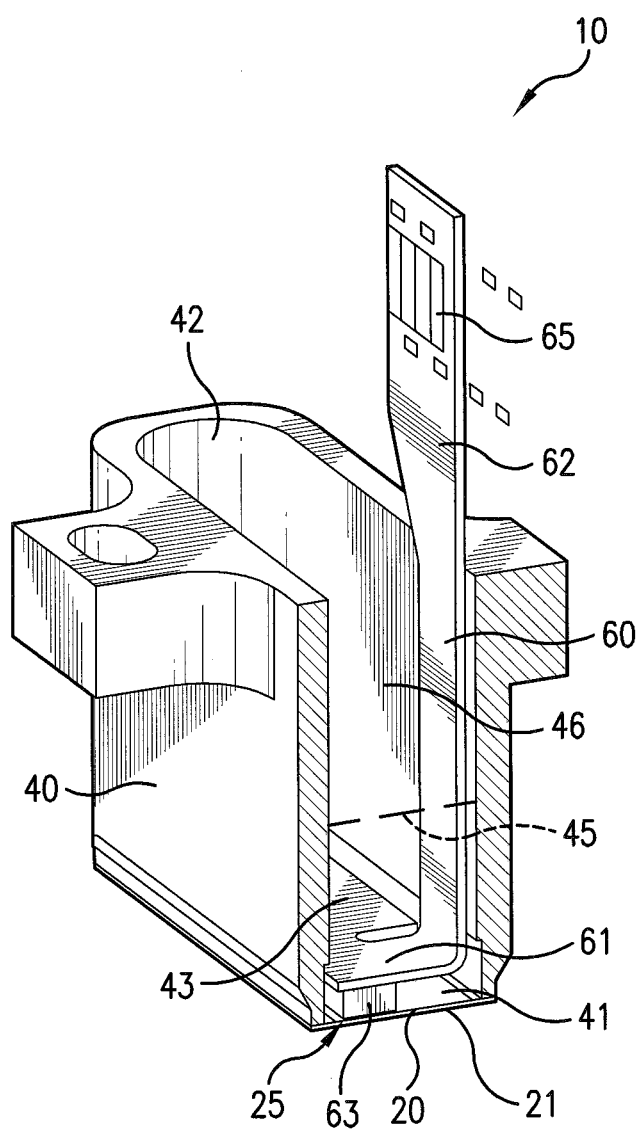
FIG. 2 is a sectional depiction of the sensor according to FIG. 1.

In FIGS. 1 and 2, an inductive sensor according to the present invention is labeled as a whole with the reference numeral 10. It includes a housing 40 with an oblong hole-shaped passage 46 that has a first opening 41 and second opening 42 at its ends. The housing is composed of rustproof, nonmagnetic steel and is manufactured by means of the metal-injection-molding method (MIM method).

The first opening 41 of the housing is connected to a metal plate 100 μm thick composed of rustproof, nonmagnetic steel. In FIG. 1, seven contact surfaces 24 are depicted on the metal plate, arranged in two rows. Between the contact surfaces 24, the conducting coils (now shown) are provided, which according to the exemplary embodiment in FIG. 9, are embodied in conjunction with FIG. 16 of EP 1 164 358 B1. The contact surfaces 24 are connected to the conducting coils in an electrically conductive fashion.

In addition, there is a flexible printed circuit board 60 equipped with a contacting section 61 and a connecting section 62, which are each provided with contact surfaces 64 and 65 that are connected to one another in an electrically conductive fashion. The width b of the connecting section 62 is smaller than the distance a between the contact surfaces 24 so that the connecting section does not cover the contact surfaces 24. The contact surfaces 24 on the metal plate and the contact surfaces 65 on the connecting section are connected to one another in an electrically conductive fashion by means of thin aluminum wires so that on the whole, there is an electrically conductive connection between the contact surfaces 64 on the contacting section and the conducting coils.

Between the connecting section 62 and the metal plate 21, a dividing layer 63 of double-sided adhesive tape is provided, which is fastened to the above-mentioned components. A casting compound (not shown) is poured into the second opening 42 until it reaches the level 45 in order to protect the above-mentioned components from environmental influences, in particular to protect them from the penetration of fluids. In addition, the casting compound gives the metal plate the necessary stability.

Figure 3:
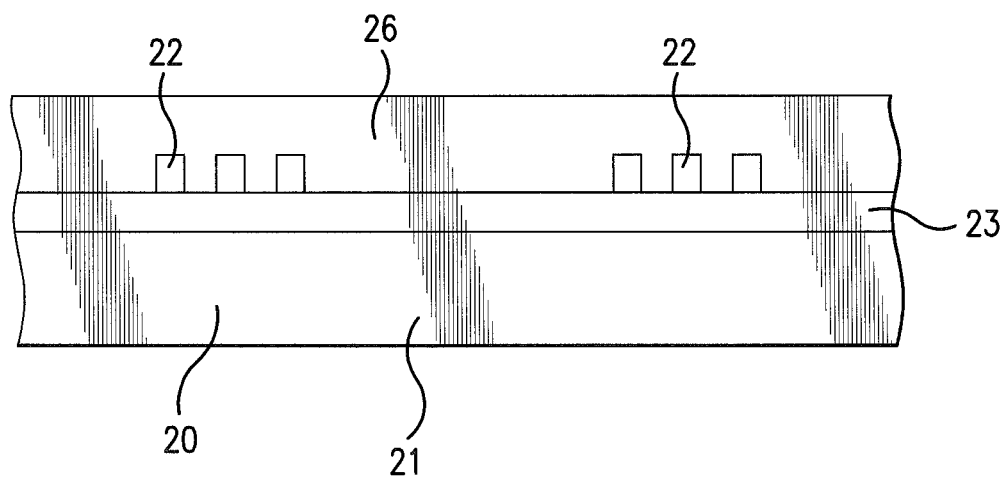
FIG. 3 is a very schematic sectional view of the metal plate with the conducting coils of the sensor according to FIG. 1.

FIG. 3 is a very schematic cross-section through the metal plate 21 showing the conducting coils 22, the electrically insulating layer 23, and an electrically insulating protective layer 26. The insulating layers 23; 26 are composed of a single monophase polyimide layer. The conducting coils are composed of copper and are approximately 2 μm thick. The width of the conducting coils and that of their spacing is approximately 10 μm. The above-mentioned values should be selected to be as small as possible so that as many conducting coils as possible are situated in the predetermined area, making the sensor very sensitive. It should also be noted that for the sake of clarity, only one layer with conducting coils is depicted in FIG. 3. Naturally, in order to produce line crossings, among other things, it is possible in a known fashion to provide additional layers with copper lines that are electrically separated from one another by polyimide layers.

Figure 4:
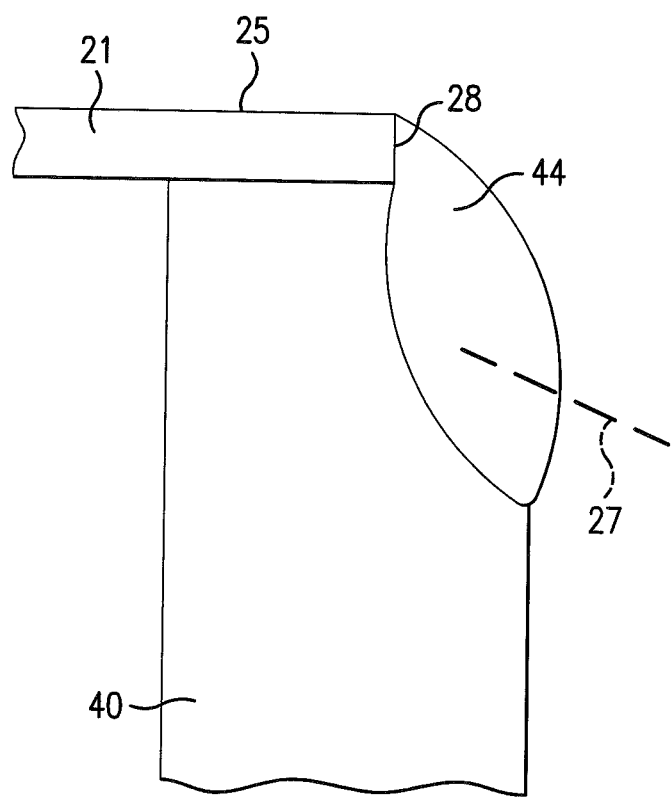
FIG. 4 is a sectional view of the welding seam between the metal plate and the housing.

FIG. 4 shows a cross section through the welding seam 44 that fastens the metal plate 21 to the housing 40. The laser welding seam has been positioned so that it does not protrude up from the outer surface 25 of the metal plate. To this end, a laser beam has been aimed at the housing in the orientation indicated in FIG. 4, causing the housing to melt. The laser output was set to be precisely high enough for the melted metal of the housing to just catch the metal plate. Because of the surface tension of the molten material, the end surface 28 of the metal plate is completely wet without the finished welding seam protruding beyond the outer surface 25 of the metal plate.

Figure 5:
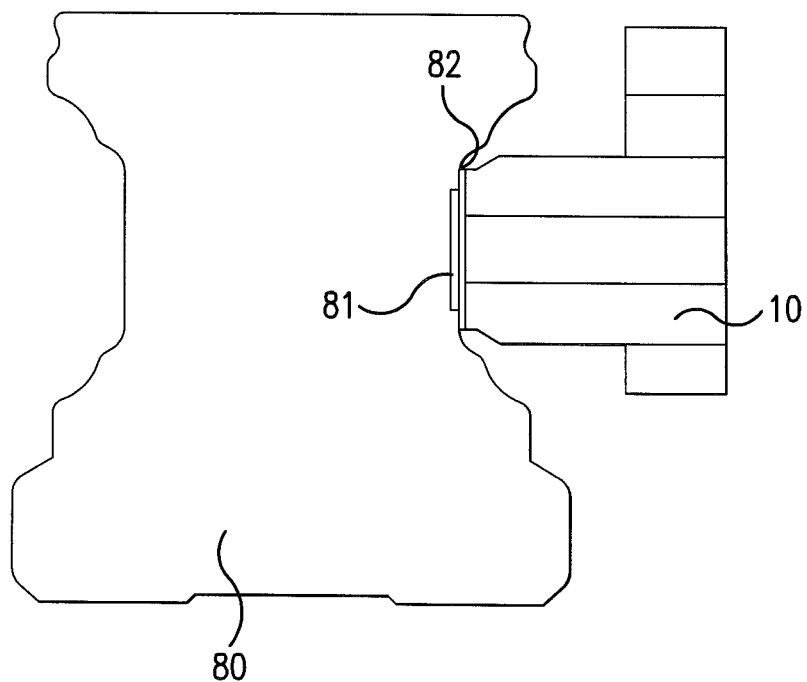
FIG. 5 is a front view of the sensor according to FIG. 1 in connection with the associated material measure.

FIG. 5 shows how the sensor 10 according to the present invention cooperates with a linear material measure 81. The material measure 81 is embodied in the form of a sheet metal strip that is composed of magnetizable sheet steel and has a multitude of periodically situated rectangular cutouts. It is mounted to the guide rail 80 of a linear roller bearing in accordance with EP 1 052 480 B1. The sensor 10 is accommodated in the measuring head from DE 103 47 360 A1, which is in turn fastened to the guide carriage of the linear roller bearing.

As has already been mentioned at the beginning, it is crucial for a precise position determination for the distance between the conducting coils 22 and the material measure 81 to be as small as possible and in any case smaller than its period, which in the present instance is 1 mm. The above-mentioned distance yields the following dimensions in the exemplary embodiment according to FIG. 5:
thickness of the cover plate 82
distance of the cover plate 82 from the metal plate 21
thickness of the metal plate 21
thickness of the electrically insulating layer 23.

It is clear from this that each individual dimension must be embodied to be as small as possible in order to achieve an optimally small distance. In particular, in order to minimize the distance between the cover plate 82 and the metal plate 21, it is important for the welding seam 44 not to protrude above the outer surface 25 of the metal plate. The above-mentioned distance must in any case be selected to be large enough that the cover plate and metal plate do not come into contact with each other during operation of the linear roller bearing in order to prevent damage.

It will be understood that each of the elements described above, or two or more together, may also find a useful application in other types of constructions differing from the type described above.

While the invention has been illustrated and described as embodied in an inductive sensor, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A position measuring system, comprising:
    a sheet metal strip composed of magnetizable sheet metal and having a multitude of periodically situated rectangular cutouts; and
    an inductive sensor with a housing forming a passage with a first opening at one end of the passage and a second opening at another end of the passage, at least one electrically conducting coil and a flexible circuit board connected to the at least one electrically conducting coil at one end and having another end for connecting to evaluation electronics;
    wherein the first opening is closed by a steel metal plate formed with an interior surface that faces an interior of the housing and an outer surface that opposes the interior surface and that faces away from the interior of the housing;
    wherein an insulation layer is integrally joined to the interior surface of the steel metal plate that faces the interior of the housing;
    wherein the at least one electrically conducting coil is positioned on and integrally joined to a surface of the insulation layer that faces away from the metal plate to the interior of the housing;
    wherein the insulation layer separates the at least one electrically conductive coil from the interior surface of the steel metal plate;
    wherein the steel metal plate both covers the at least one electrically conducting coil and functions as a substrate to provide stability for the at least one conducting coil;
    wherein the outer surface of the steel metal plate faces the sheet metal strip; and
    wherein a distance between the at least one electrically conducting coil and the sheet metal strip is smaller than a period of the multitude of periodically situated rectangular cutouts.

2. The position measuring system as defined in claim 1, wherein said insulating layer is thinner than 10 mm.

3. The position measuring system as defined in claim 1, wherein said at least one conducting coil is a flat spiral.

4. The position measuring system as defined in claim 3, wherein said flat spiral has at least 10 loops.

5. The position measuring system as defined in claim 1, wherein said insulating layer is composed of polyimide.

6. The position measuring system as defined in claim 1, wherein said insulating layer is configured as a layer manufactured with a centrifuge method.

7. The position measuring system as defined in claim 1, wherein said steel metal plate is a plate welded to said housing with a welding seam that does not protrude above a plane defined by the outer surface of said metal plate.

8. The position measuring system as defined in claim 7, wherein said steel metal plate is a flat metal plate.

9. The position measuring system as defined in claim 1, wherein a casting material is poured into the second opening of said housing.

10. The position measuring system as defined in claim 1, wherein the flexible printed circuit board is provided with a contacting section and a connecting section, said contacting section being completely covered by a casting compound and said connecting section protrudes out from said casting compound.

11. The position measuring system as defined in claim 10, further comprising a dividing layer provided between said contacting section and said steel metal plate and being at least five times thicker than said metal plate.

12. The inductive sensor as defined in claim 1, wherein the steel metal plate is fastened directly to the housing.

* * * * *